United States Patent Office 3,514,381
Patented May 26, 1970

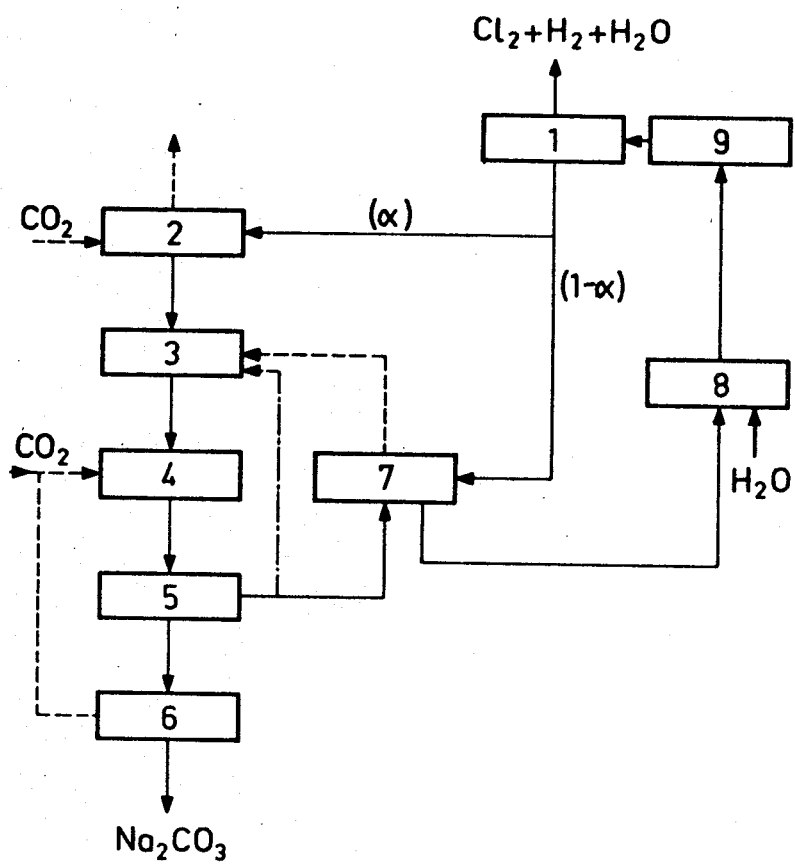

3,514,381
CYCLIC PROCESS FOR THE FABRICATION OF SODIUM CARBONATE AND OF CHLORINE
Pierre Seguela, Woluwe-Saint-Pierre, Belgium, assignor to Solvay & Cie, Brussels, Belgium
Filed Feb. 20, 1967, Ser. No. 617,166
Claims priority, application Belgium, Mar. 1, 1966, 24,662, Patent 677,187
Int. Cl. B01k 1/00
U.S. Cl. 204—87      9 Claims

ABSTRACT OF THE DISCLOSURE

A cyclic process for the production of sodium carbonate and chlorine which combines an ammoniac soda producing process and the carbonation of briny caustic alkali solutions and the electrolysis of aqueous sodium chloride in diaphragm-type cells. The briny caustic alkali solution flowing out of the electrolysis cells is divided into two fractions, one of which undergoes a precarbonation prior to being introduced into the soda process at an ammoniac absorption stage, the other is utilized for the recovery of ammoniac from the filtration mother liquors of the soda process.

BACKGROUND OF THE INVENTION

The present invention relates to a cyclic process for the production of sodium carbonate and chlorine and more particularly, to such a cyclic process combining an ammoniac soda-producing process with the carbonation of briny (salty) caustic alkali solutions and the electrolysis of aqueous sodium chloride in diaphragm-type cells.

It is well known that in cells having diaphragms, the rate of decomposition of sodium chloride is less than 100% so that the caustic alkali solution obtained always contains a more or less high concentration of nonconverted sodium chloride. In fact, in current practice, the percentage of decomposition is often about 50%.

Applicant's Belgian Pat. No. 621,370 describes a procedure for producing sodium carbonate which consists of carbonating briny caustic alkali solutions derived from diaphragm cells together with ammoniacal brines in the fabrication cycle of ammonia soda. The term "briny caustic alkali solution" as used herein and throughout the remainder of the specification and appended claims refers to the liquid leaving the diaphragm cells in the electrolysis process. According to this process, the briny caustic alkali solution is introduced into the carbonation column at the same time as the ammoniacal brine obtained in the usual manner from a starting material of purified brine. The briny caustic alkali solution can preliminary undergo a carbonization with the aid of residual gases from the soda works. The recovery of the ammonia is accomplished by the standard method of lime distillation of the solution of ammonium chloride and sodium chloride exiting from the filters.

Also, in French Pat. No. 460,837 it was suggested to decompose the liquid from the soda works filters by using, instead of lime, a briny caustic alkali solution produced by the electrolysis of a sodium chloride solution. By such a process a solution of sodium chloride was obtained which could be submitted anew to electrolysis and reused for expelling ammonia from filtration mother liquors. The brine employed in the soda works was, in this process, totally free of caustic soda or sodium carbonate.

Additionally, French Pat. No. 1,105,621 describes in one of its embodiments, a process for the fabrication of ammonia soda associated with an installation for the electrolysis of sodium chloride solutions in cells having mercury cathodes. The decomposition of ammonium chloride contained in the liquid of the soda works filter is effectuated with the aid of the nonbriny caustic alkali solution flowing from the amalgam decomposition unit, while the spent brine flowing out of the mercury cells is recycled partially to the head end of the soda works and partially to the electrolysis after resaturation. Here, also the brine employed in the soda works is free of caustic soda or sodium carbonate.

In addition, different processes are known for the production of sodium carbonate by the carbonation of caustic alkali solutions obtained by the electrolysis of sodium chloride brines, from diaphragm cells as well as from cells having mobile mercury cathodes, all of these processes utilizing the gaseous carbon dioxide as a carbonation agent.

SUMMARY OF THE INVENTION

It has now been found in accordance with the present invention that it is possible to combine the manufacture of soda employing ammoniac, the carbonation of caustic alkali solution and the electrolysis of aqueous solutions of sodium chloride in diaphragm-type cells, while achieving conditions which are more advantageous than those which have been obtained to date.

It is therefore a principal object of the present invention to provide a new and improved cyclic process for the production of sodium carbonate and chlorine.

It is yet a further object of the present invention to provide such a process effectively combining an ammoniac soda-producing process with the carbonation of briny caustic alkali solutions and the electrolysis of aqueous sodium chloride in diaphragm-type cells.

Still further objects and advantages of the process of the present invention will become more apparent from the following more detailed description of the present invention.

The process of the invention is characterized in that the briny caustic alkali solution leaving the diaphragm-type electrolyzing cells is divided into two fractions, one of which undergoes a precarbonation by means of a gas containing the carbon dioxide before being introduced into the soda works at the ammonia absorption stage, while the other fraction of the briny caustic alkali solution is utilized for recovering the ammonia starting from the filtration mother liquors of the works, the sodium chloride solution exiting from this recover stage being then resaturated in sodium chloride, purified and returned to the electrolysis.

BRIEF DESCRIPTION OF THE DRAWING

The single figure of the drawing is a simplified schematic diagram of the operating cycle according to the present invention.

DESCRIPTION OF THE PREFERRED EMBODIMENTS

A brine of sodium chloride, reconstituted as explained below, is introduced into a battery of diaphragm-type electrolysis cells 1 from which are removed chlorine, hydrogen and water vapor. The briny caustic alkali solution leaving the cells is divided into two fractions in variable proportions according to the conditions under which the process is being carried out. One fraction of said briny caustic alkali solution is delivered to a carbonation zone 2 where it is brought into contact with a gas containing carbon dioxide in such a manner as to transform all or part of the caustic soda found in the briny alkali solution into a carbonate. This can be accomplished by utilizing a gas having a low concentration of carbon dioxide; for example, residual gases or combustion gases. The liquid formed in the carbonation zone 2 then passes into an absorber 3 where it is brought into contact with the gaseous mixture derived from the subsequent ammonia recuperation stage (distillation) 7; then it is delivered into a carbonation column 4 where it is brought into contact with a gas or gas mixture rich in carbon dioxide, primarily due to the fact that it principally contains gas supplied from the calcination of the sodium bicarbonate in carbonate (drier) 6. The broth leaving the carbonation column 4 is treated as it is in normal soda works, i.e., it passes to the filtration zone 5, the cake from the filters being calcinated in the drier 6 while the filtration mother liquors pass to the ammoniac recuperation stage (distillation) 7. In this stage, the mother liquors, instead of being lime distilled, are treated by the other fraction of the briny caustic alkali solution flowing from the diaphragm-type cells. The separated gases, which contain ammonia, carbon dioxide, and water vapor, are sent to the absorber 3, while the sodium chloride solution obtained is resaturated with salt, possibly after having received an added amount of water at 8, and then passes to the purification stage 9 and is introduced into the cells 1. The resaturation with salt can be realized by the addition of solid salt, by delivery into borings or by any other appropriate means.

The proportions of briny caustic alkali solution to be sent to the carbonation zone 2 and the ammonia recuperation stage 7, respectively, are influenced by the rate of decomposition of the electrolysis and are determined by the quantity of caustic soda necessary for decomposing the ammonium chloride introduced into the ammonia recuperation zone 7, which is itself related to the efficiency of the utilization of sodium chloride in the carbonation column 4.

The general balance of NaCl-NaOH can be represented by the equation:

$$(1-\tau)\alpha r = (1-\alpha)\tau \text{ where } \alpha = \frac{\tau}{\tau(1-r)+r}$$

in which $\tau$ is the rate of decomposition of sodium chloride in the electrolysis, $r$ is the efficiency of utilization of sodium chloride in the soda process and $\alpha$ is the portion of briny caustic alkali solution passing to the front end of the soda works.

It will be noted that it is possible to modify, within certain limits, the division $$\frac{\alpha}{1-\alpha}$$

of the briny caustic alkali solution by acting, on the one hand, on the conditions of exploitation of the electrolysis (action on $\tau$), and, on the other hand, on the conditions of exploitation of the carbonation, i.e., quantity of ammonia brought into play, temperature at the end of the reaction, etc. (action on $r$).

The following is a specific example of the application of the present invention. This example in no way limits the scope of the present invention, but only permits a better appreciation and understanding of the advantages of the process thereof:

EXAMPLE

A briny caustic alkali solution containing, per metric ton, 102 kg. of NaOH, 148 kg. of NaCl and 750 kg. of water, which corresponds to a $\tau$ of 0.502, was employed. Assuming that $r=60\%$, by substitution into the above equation, it is possible to obtain:

$$(1-0.502)\ 0.6\alpha = (1-\alpha)\ 0.502$$

which gives a value of 0.627 for $\alpha$.

Taking into account a small excess of caustic soda in the liquid of the distiller (1 kg./metric ton $Na_2CO_3$) the composition of the briny solution employed, per metric ton of sodium carbonate to be produced, is:

| | Kg. |
|---|---|
| NaOH | 756 |
| NaCl | 1097 |
| $H_2O$ | 5559 |
| | 7412 |

The distribution of NaOH is made as follows: at the head end of the process (soda works)

| | Kg. |
|---|---|
| 755 kg.×0.627 | 473 |
| at the point of recuperation of the ammoniac | |
| 755 kg.×0.373+1 kg. | 283 |
| | 756 |

In the following table, the quantities are expressed in kilograms.

| Operation | | Result of the operation | |
|---|---|---|---|
| Electrolysis, Brine: | | Gas: | |
| NaCl | 2,203 | $H_2$ | 19 |
| $H_2O$ | 6,325 | $Cl_2$ | 671 |
| | | $H_2O$ | 426 |
| | | Briny caustic alkali solution: | |
| | | NaOH | 756 |
| | | NaCl | 1,097 |
| | | $H_2O$ | 5,559 |
| Total | 8,528 | | 8,528 |
| Recuperation of $CO_2$: | | | |
| Briny caustic alkali solution: | | Carbonated solution: | |
| NaOH | 473 | $Na_2CO_3$ | 627 |
| NaCl | 688 | NaCl | 688 |
| $H_2O$ | 3,485 | $H_2O$ | 3,485 |
| Gases: | | Lost gases: | |
| $CO_2$ | 325 | $CO_2$ | 65 |
| $H_2O$ | 37 | $H_2O$ | 143 |
| Total | 5,008 | | 5,008 |
| Absorption: | | | |
| Carbonated solution: | | Ammoniacal brine: | |
| $Na_2CO_3$ | 627 | $CO_2$ | 128 |
| NaCl | 688 | $NH_3$ | 186 |
| $H_2O$ | 3,485 | NaCl | 688 |
| Distillation gases: | | $H_2O$ | 3,551 |
| $CO_2$ | 128 | $Na_2CO_3$ | 627 |
| $NH_3$ | 186 | | |
| $H_2O$ | 66 | | |
| Total | 5,180 | | 5,180 |
| Carbonation: | | | |
| Ammoniacal brine: | | Broth: | |
| $CO_2$ | 128 | $CO_2$ | 128 |
| $NH_3$ | 186 | $NH_3$ | 66 |
| NaCl | 688 | NaCl | 275 |
| $H_2O$ | 3,551 | $H_2O$ | 3,328 |
| $Na_2CO_3$ | 627 | $NH_4Cl$ | 378 |
| Carbonation gases: | | $NaHCO_3$ | 1,585 |
| $CO_2$ | 587 | Gas | |
| $H_2O$ | 16 | $CO_2$ | 17 |
| | | $H_2O$ | 6 |
| Total | 5,783 | | 5,783 |
| Distillation: | | | |
| Liquid from the filters: | | Water (400 kg. of which is for washing the filter) | 900 |
| $CO_2$ | 128 | Gases to the absoprtion: | |
| $NH_3$ | 66 | $CO_2$ | 128 |
| NaCl | 275 | $NH_3$ | 186 |
| $NH_4Cl$ | 378 | $H_2O$ | 66 |
| $H_2O$ | 3,444 | | |
| Condensation from the drier, $H_2O$ | 446 | Liquid from the distiller: | |
| Briny caustic alkali solution: | | NaOH | 1 |
| NaOH | 283 | NaCl | 1,097 |
| NaCl | 409 | $H_2O$ | 5,864 |
| $H_2O$ | 2,074 | | |
| Vapor | 739 | | |
| Total | 8,242 | | 8,242 |

In this particular case, it was necessary, in order to assure that all of the water quantities balanced out, to add some water to the liquid leaving the distiller, during saturation.

The balancing out of the water quantities is influenced principally by the operating conditions of the electrolysis operation (quantity of water carried off with the chlorine and hydrogen produced). Under certain conditions it will be necessary not to add water, but to remove some by partial concentration of the liquid leaving the ammoniac recuperation stage. For this concentration one could utilize the heat lost from the process.

The process according to the present invention presents numerous advantages:

The tonnage of sodium chloride obtained is the stoichiometric equivalent of the chlorine produced in the electrolyzing cells;

The NaCl yield attains 100% while it only reaches around 72% or 73% in a normal soda producing system;

The gases which are lean in $CO_2$, habitually exhausted into the atmosphere, can be valued and employed to constitute a source of a large portion of the $CO_2$, utilized in the soda-producing process; this represents a solution to the always delicate problem of the carbon dioxide balance in soda works not provided with a lime kiln;

The circulation of the liquid in a closed circuit, without any flow-off to a river or stream, permits the attainment of substantial economies and the avoidance of the inconveniences inherent in the pollution of water courses;

The suppression of the use of lime permits the installation for carrying out this process to do without lime kilns and avoids the various disadvantages resulting from the calcium-containing by-products, for example, the necessity for providing basins for storing residual sludges;

The high temperature (90° C.) at which the briny caustic alkali solution can be employed for the regeneration of the ammonia exerts a favorable influence on the thermal balance sheet of the process;

The optimum regulation of the diaphragm-type cells can be different from the normal regulation (rate of decomposition around 50%), according to the relative prices of electrical energy and steam.

It should be noted, in addition, that the traditional apparatus of soda works remains practically unchanged and that existing installations can easily be adapted to the process of the present invention.

Although under certain conditions of use, precipitations might occur in the ammoniac absorption zone, this difficulty can easily be avoided by recycling to this point a certain portion of the filtration mother liquors. This recycling can involve 15% to 20%, by weight, of the mother liquors.

While a particular embodiment of the present invention has been illustrated by way of a specific example, it is to be understood that the present invention is in no way to be deemed as limited thereto but should be construed as broadly as all or any equivalents thereof.

I claim:

1. In a cyclic process for the production of sodium carbonate and chlorine which combines an ammoniac soda-producing process, the carbonation of briny caustic alkali solutions and the electrolysis of aqueous sodium chloride solution in diaphragm-type cells, the improvement which comprises dividing the briny caustic alkali solution flowing out of the electrolysis cells into two fractions, one of which undergoes a precarbonation by means of a gas containing carbon dioxide before being introduced into the soda process at an ammoniac absorption stage, the other of which is utilized for the recovery of ammoniac from the filtration mother liquors of the soda process.

2. The process of claim 1, wherein the quantity of gas containing carbon dioxide introduced for the precarbonation is sufficient to convert all of the caustic soda present in the briny caustic alkali solution subjected to precarbonation into the carbonate.

3. The process of claim 1, wherein a portion of the filtration mother liquors is removed and introduced into the ammoniac absorption zone.

4. The process of claim 3, wherein the portion of filtration mother liquors introduced into the ammoniac absorption zone is from about 15% to 20%, by weight, of the total supply of mother liquors.

5. The process of claim 1, wherein the gas utilized for the precarbonation of the fraction of the briny caustic alkali solution is a gas which is poor in carbon dioxide.

6. A cyclic process for the production of sodium carbonate and chlorine which comprises:
 (a) electrolyzing aqueous sodium chloride solution in a diaphragm-type cell,
 (b) dividing aqueous briny caustic solution from the cell into two fractions,
 (c) precarbonating one of the two fractions,
 (d) introducing a portion of the precarbonated fraction into an ammoniac recuperation stage of an ammoniac soda-producing process, and
 (e) introducing the other of said two fractions into the ammoniac recuperation stage of the ammoniac soda-producing process.

7. A process according to claim 6 wherein the precarbonation is effected by gas containing carbon dioxide, the precarbonated fraction is filtered and a portion of the filtrate constitutes the portion of the precarbonated fraction which is introduced into the ammoniac recuperation stage of the ammoniac soda-producing process.

8. A process according to claim 7 wherein, prior to the filtration, said precarbonated fraction is passed through an absorber wherein it is brought into contact with gas derived from said recuperation stage and any of said filtrate which is not introduced into said ammoniac recuperation stage.

9. A process according to claim 6 wherein ammonium chloride is introduced into the ammoniac recuperation stage and the aqueous sodium chloride solution obtained from said stage is saturated with salt and fed into the diaphragm-type cell.

References Cited

UNITED STATES PATENTS

| 2,287,061 | 6/1942 | Osborne et al. | 204—87 |
| 2,842,489 | 7/1958 | Suanoe | 204—87 |
| 3,179,579 | 4/1965 | Heineman et al. | 204—87 |

TA-HSUNG TUNG, Primary Examiner

U.S. Cl. X.R.

204—128, 129; 23—63, 65